US012723455B2

(12) United States Patent
Miura et al.

(10) Patent No.: US 12,723,455 B2
(45) Date of Patent: Sep. 1, 2026

(54) CONTROL APPARATUS AND VEHICLE

(71) Applicant: TOYOTA JIDOSHA KABUSHIKI KAISHA, Toyota (JP)

(72) Inventors: Mitsuhiro Miura, Toyota (JP); Yoshiaki Tomatsu, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/185,472

(22) Filed: Apr. 22, 2025

(65) Prior Publication Data

US 2025/0333993 A1 Oct. 30, 2025

(30) Foreign Application Priority Data

Apr. 25, 2024 (JP) ................................ 2024-071248

(51) Int. Cl.
*E05F 15/40* (2015.01)
*B60Q 9/00* (2006.01)
*B60R 1/29* (2022.01)

(52) U.S. Cl.
CPC ................ *E05F 15/40* (2015.01); *B60Q 9/00* (2013.01); *B60R 1/29* (2022.01); *B60R 2300/8006* (2013.01); *E05Y 2900/531* (2013.01)

(58) Field of Classification Search
CPC ..... E05F 15/40; E05F 15/73; E05F 2015/767; E05F 15/695; B60Q 9/00; B60R 1/29; B60R 2300/8006; E05Y 2900/531
See application file for complete search history.

(56) References Cited

U.S. PATENT DOCUMENTS 8,869,449 B2 * 10/2014 El Fassi .................. E05F 15/40 49/28
2022/0398765 A1 * 12/2022 Tomatsu ................ G06V 40/10
2023/0196785 A1 * 6/2023 Kozuka .................. G06V 20/56 382/104
2023/0339401 A1 * 10/2023 Ham ....................... B60R 1/007

FOREIGN PATENT DOCUMENTS

JP 2008182341 A * 8/2008
JP 2022-094724 A 6/2022
JP 2023142945 A * 10/2023

* cited by examiner

*Primary Examiner* — Nay Tun
(74) *Attorney, Agent, or Firm* — Dinsmore & Shohl LLP

(57) ABSTRACT

If it is detected that a passenger is present in the predetermined area set near the door inside the vehicle while the door is in open state, a control apparatus prohibits door closing control. The control apparatus displays, when a close button is pressed by a driver while the door closing control is prohibited, image captured by an in-vehicle camera at the timing when the close button is pressed, on a display for a predetermined period of time, together with real-time image of the inside of the vehicle captured by the in-vehicle camera in a divided manner.

8 Claims, 6 Drawing Sheets

CONTROL APPARATUS AND VEHICLE

CROSS REFERENCE TO THE RELATED APPLICATION

This application claims the benefit of Japanese Patent Application No. 2024-071248, filed on Apr. 25, 2024, which is hereby incorporated by reference herein in its entirety.

BACKGROUND

Technical Field

The present disclosure relates to door closing control of a vehicle on which a plurality of passengers are on board.

Description of the Related Art

Patent Literature 1 discloses a monitoring system for remotely monitoring the cabin of multiple vehicle with passengers on board. In the monitoring system disclosed in Patent Document 1, images captured by cameras installed in each vehicle are displayed on a display device.

CITATION LIST

Patent Literature

Patent Literature 1: Japanese Patent Application Laid-Open Publication No. 2022-094724

SUMMARY

The purpose of present disclosure is to provide technology that contributes to the driver accurately grasping the situation inside a vehicle on which a plurality of passengers are on board.

The control apparatus according to the first aspect of the present disclosure may be a control apparatus that controls a door of a vehicle on which a plurality of passengers are on board, wherein

- a predetermined area, where door closing control is prohibited when it is detected that a passenger is present in the area, is set near the door inside the vehicle,
- a close button pressed by a driver of the vehicle when the driver executes the door closing control, an in-vehicle camera that captures an image of the interior of the vehicle including the predetermined area, and a display that displays the image of the interior of the vehicle captured by the in-vehicle camera, are provided in the vehicle,
- the control apparatus having a controller configured to:
  - prohibit the door closing control when it is detected that the passenger is present in the predetermined area while the door is in open state, and
  - display, when the close button is pressed by the driver while the door closing control is prohibited, image captured by the in-vehicle camera at the timing when the close button is pressed, on the display for a predetermined period of time, together with real-time image of the inside of the vehicle captured by the in-vehicle camera in a divided manner.

A vehicle according to the second aspect of the present disclosure may be a vehicle comprising the control apparatus according to the first aspect of the present disclosure.

According to the present disclosure, it is possible to provide a technique that contributes to the driver accurately grasping the situation inside a vehicle in which a plurality of passengers are.

DESCRIPTION OF THE EMBODIMENTS

Figure 1:
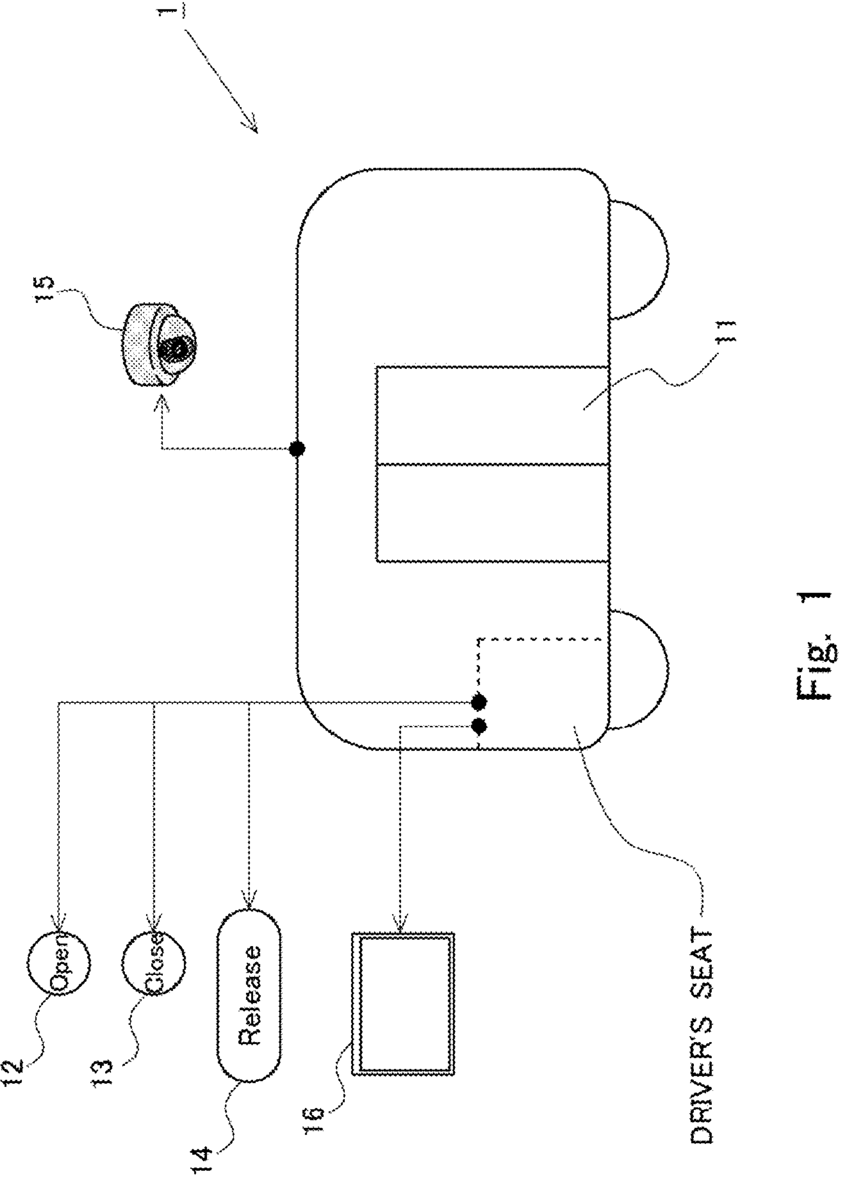
FIG. 1 is a diagram for explaining various devices mounted on a vehicle.

In a vehicle (for example, a route bus or a shared vehicle) in which a plurality of passengers are boarded, the door is opened and closed by the operation of the driver. Here, a close button operated by the driver may be provided on the vehicle. The close button is a button that is pressed by the driver when the driver causes the vehicle to perform the door closing control.

Further, if the door closing control is executed while a passenger is present near the door inside the vehicle, the passenger may be caught by the door. In order to prevent incidents where passengers get caught by the door of the vehicle, there might be a predetermined area set near the doors inside the vehicle. the predetermined area is set as an area where the door closing control is prohibited if it is detected that a passenger is present in the area. In a vehicle in which such a predetermined area is set, door closing control is prohibited when it is detected that a passenger is present in the predetermined area when the door is in open state. When door closing control is prohibited, even if the driver presses close button, it is usually door closing control is not executed.

Here, a possible reason why the door closing control is not executed even though the driver has pressed the close button is that the door is broken. Therefore, if the door closing control is not executed, the driver needs to check whether there are passengers in the predetermined area in order to grasp the cause. However, even if the door closing control is not executed because there is a passenger in the predetermined area at the time when the driver presses the close button, the passenger may move from the predetermined area immediately thereafter. In this case, even if the driver confirms the situation near the door after the passenger moves from the predetermined area, the driver cannot grasp the factor that the door closing control was not executed. Therefore, in order for the driver to grasp the factor for which the door closing control was not executed, it is necessary for the driver to be able to confirm the situation near the door at the timing when the close button is pressed.

The control apparatus according to the present disclosure is an apparatus that controls the door of a vehicle on which a plurality of passengers are boarded. Further, a predetermined area is set near the door inside the vehicle. In addition, the vehicle is provided with a close button that is operated by the driver. In the control apparatus according to the present disclosure, when it is detected that there is a passenger in a predetermined area when the door is open state, the controller prohibits the door closing control.

In addition, the vehicle is provided with an in-vehicle camera and a display. The in-vehicle camera is a camera that captures an image of the inside of the vehicle including a predetermined area. The display displays an image of the interior of the vehicle captured by the in-vehicle camera. Therefore, the driver can grasp the state of the interior of the vehicle by checking the image displayed on the display.

In the control apparatus according to the present disclosure, when the close button is pressed by the driver while the door closing control is prohibited, the controller displays image captured by the in-vehicle camera at the timing when the close button is pressed, on the display for a predetermined period of time. At this time, the controller displays on the display the image captured by the in-vehicle camera at the timing when the close button is pressed together with the real-time image of the in-vehicle interior captured by the in-vehicle camera in a divided manner.

As described above, by displaying the two images on the display in a divided manner, it is possible for the driver to check the situation in the predetermined area at the timing when the close button is pressed, as well as the real-time situation inside the vehicle. Therefore, even if a passenger is moving from within a predetermined area immediately after the close button is pressed, the driver can grasp that a passenger was present in the predetermined area at the time when the close button was pressed. That is, when the door closing control is not executed because there was a passenger in the predetermined area, the driver can grasp the factor that the door closing control was not executed. Therefore, according to the present disclosure, it is possible for the driver to accurately grasp the situation inside the vehicle on which a plurality of passengers are on board.

Hereinafter, a specific embodiment of the present disclosure will be described with reference to the drawings. Dimensions, materials, shapes, relative positions and the like of structural components described in the present embodiment are not intended to limit the technical scope of the present disclosure unless stated otherwise.

Embodiment (Schematic Configuration of Vehicle)

Figure 2:
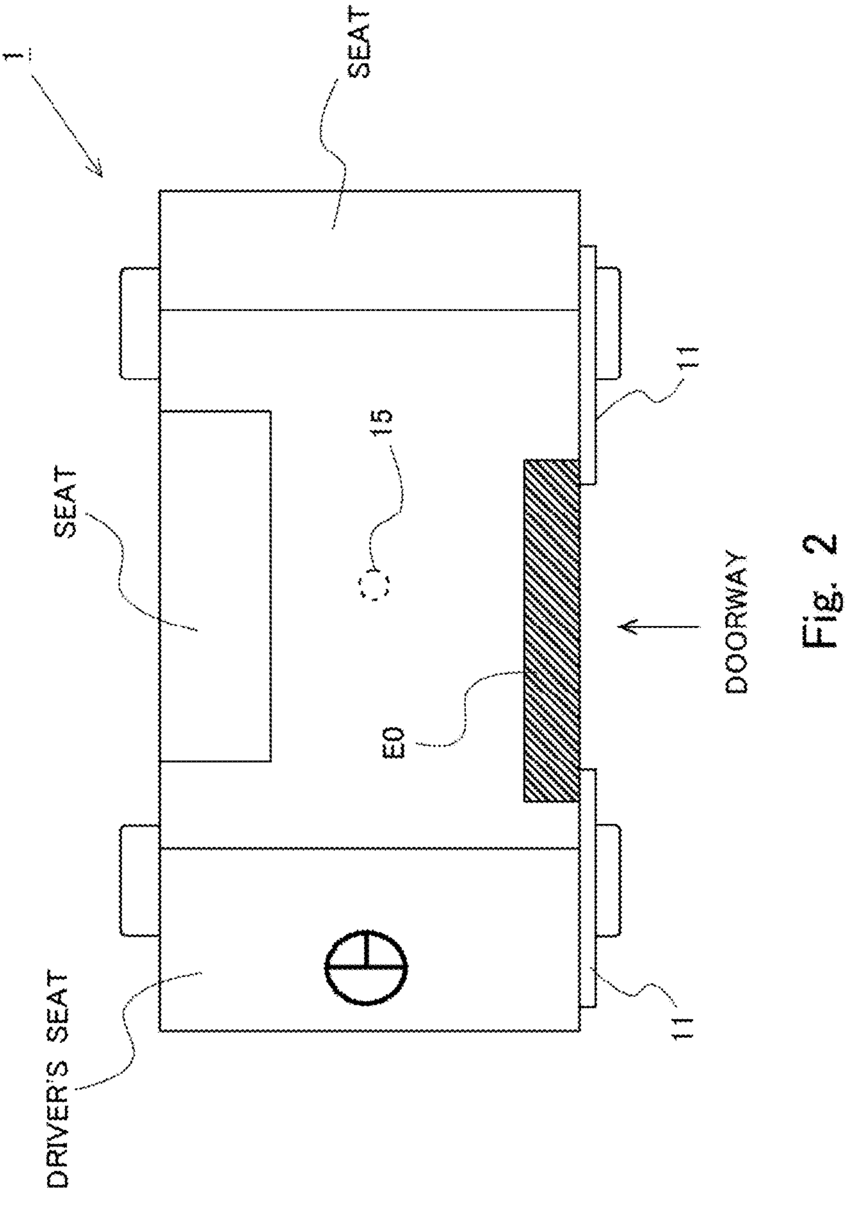
FIG. 2 is a diagram to explain state inside a vehicle.

A schematic configuration of a vehicle according to the present embodiment will be described on the basis of FIGS. 1 and 2. FIG. 1 is a diagram for explaining various devices mounted on the vehicle. FIG. 2 is a diagram to explain the inside of the vehicle. A vehicle 1 is a vehicle on which a plurality of passengers are on board. For example, the vehicle 1 may be a route bus, a shared vehicle, or the like.

The vehicle 1 is a vehicle driven by the driver. The driver of the vehicle 1 executes various operations necessary for the operation of the vehicle 1 together with the operation of the vehicle 1 in the driver's seat of the vehicle. In addition, a seat is installed in the vehicle 1 for passengers to sit on. However, the vehicle 1 has a space in the vehicle in which there is a passenger who is not seated in the seat, that is, a passenger who gets on in a standing state (standing passenger).

A door 11 is provided on the side of the vehicle 1. The door 11 is a door for opening and closing the entrance and exit where passengers get on and off in the vehicle 1. When passengers get on and off the stopped vehicle 1, the door 11 is open. The door 11 is a sliding door that slides in the longitudinal direction of the vehicle 1 when opening and closing. In vehicle 1, the floor surface of the space used by passengers, including the vicinity of the door 11 in the vehicle, is formed substantially flat. Therefore, the passengers of vehicle 1 can easily move inside the vehicle 1. Note, the door of vehicle 1 does not necessarily have to be a sliding type. Further, it is not mandatory that the floor surface inside the vehicle 1 is flat.

An in-vehicle camera 15 is installed on the vehicle 1. The in-vehicle camera 15 can image approximately the entire space used by passengers inside the vehicle 1. Therefore, the in-vehicle camera 15 can capture an image including a passenger and a standing passenger seated in the seat. Further, the in-vehicle camera 15 can also image passengers getting on and off through the doorway of the vehicle 1. Further, a display 16 is disposed near the driver's seat of the vehicle 1. The display 16 displays an image captured by the in-vehicle camera 15. Therefore, the driver of the vehicle 1 can monitor the situation inside the vehicle 1 by the image displayed on the display 16. Basically, the display 16 displays a moving image of the inside of the vehicle 1 captured by the in-vehicle camera 15 in real time.

Further, an open button 12, a close button 13, and a release switch 14 are disposed in the driver's seat of the vehicle 1. In the vehicle 1, the opening/closing control of the door 11 is executed according to the operation of the open button 12 or the close button 13 by the driver. Specifically, when the open button 12 is pressed by the driver when the door 11 is in close state, the opening control of the door 11 is executed. Further, when the close button 13 is pressed by the driver when the door 11 is in open state, the closing control of the door 11 is executed. Further, in the vehicle 1, the closing control of the door 11 may be automatically prohibited as described later. In a state where the closing control of the door 11 is prohibited, basically, even if the close button 13 is pressed by the driver, the closing control of the door 11 is not executed. However, when the closing control of door 11 is prohibited, if the release switch 14 is turned ON by the driver, the prohibition of closing control of door 11 is canceled.

Here, the prohibition of closing control of the door 11 in the vehicle 1 and its cancellation will be described. If the closing control of the door 11 is executed while a passenger is present near the door 11 in the vehicle 1, there is a possibility that the passenger is caught by the door 11. In particular, as described above, the door 11 in the vehicle 1 is a sliding door, and the floor surface is substantially flat in the vehicle, including the vicinity of the door 11. Therefore, it is easy for passengers to approach the door 11 in the vehicle 1. Therefore, a situation in which a passenger may be caught by the door 11 when the closing control of the door 11 is executed is likely to occur.

Therefore, as indicated in FIG. 2, in the interior of the vehicle 1, the prohibited area E0 is set near the door 11. The prohibited area E0 is set as an area where the closing control of the door 11 is prohibited when the presence of a passenger is detected inside. Note that whether or not there is a passenger in the prohibited area E0 can be determined based on the image captured by the in-vehicle camera 15. Then, if it is detected that there is a passenger in the prohibited area E0 when the door 11 is in open state, the closing control of the door 11 is prohibited.

Here, as described above, the display 16 displays a moving image of the inside of the vehicle captured by the in-vehicle camera 15 in real time. Therefore, if the driver presses close button 13, but the closing control of door 11 is not executed, The image displayed on the display 16 allows the situation near the door 11 in the vehicle to be confirmed. That is, the driver can confirm whether or not there is a passenger in the prohibited area E0 by the image displayed on the display 16. However, even if the close button control of the door 11 is not executed because there was a passenger in the prohibited area E0 at the time when the close button 13 was pressed by the driver, the passenger may move from the prohibited area E0 immediately thereafter. In such a case, there may be no passengers in the prohibited area E0 at the time when the driver confirms the image displayed on the display 16. In that case, in the real-time image of the inside of the vehicle displayed on the display 16, the driver cannot grasp the factor that the closing control of the door 11 was not executed.

Therefore, in the vehicle 1 according to the present embodiment, when the close button 13 is pressed by the driver when the closing control of the door 11 is prohibited due to the presence of passengers in the prohibited area E0, two images are divided and displayed on the display 16. Specifically, when the close button 13 is pressed by the driver when the closing control of the door 11 is prohibited, the image captured by the in-in-vehicle camera 15 is acquired as a still image at the timing when the close button 13 is pressed. In the following, the still image acquired at this time may be referred to as a "pressing timing image". Then, the press timing image is displayed on the display 16 together with a real-time image of the interior of the vehicle captured by the in-vehicle camera 15 (hereinafter, sometimes referred to as a "real-time image") in a divided manner.

(Hardware Configuration of Control Apparatus)

Figure 3:
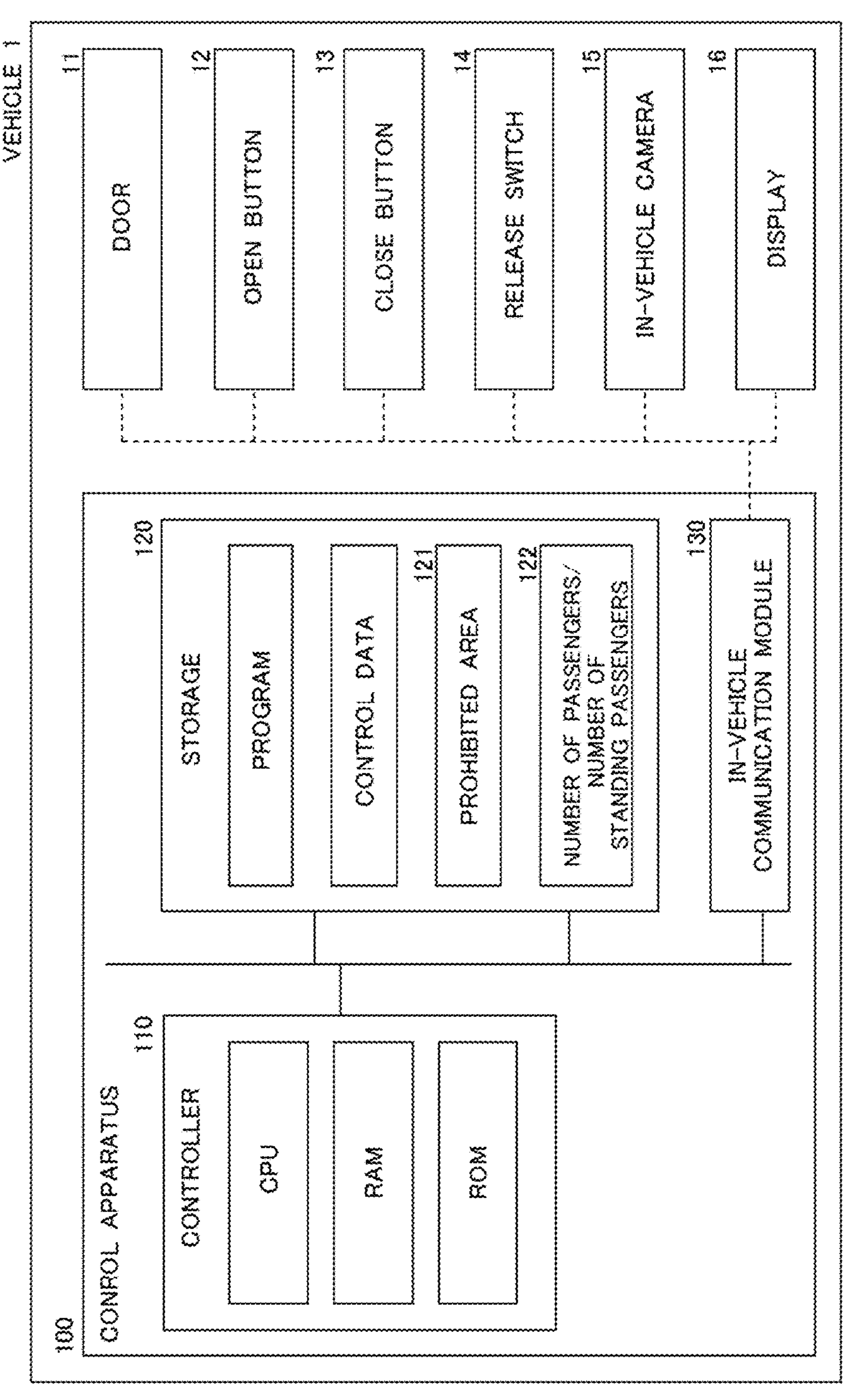
FIG. 3 is a block diagram schematically showing the hardware configuration of a control apparatus mounted on a vehicle.

Next, a control apparatus mounted on vehicle 1 will be described based on FIG. 3. FIG. 3 is a schematic hardware configuration of the control apparatus mounted on the block FIG. 3. The control apparatus 100 is an apparatus that controls the opening and closing of the door of the vehicle 1. In the vehicle 1, the control apparatus 100 is connected to the door 11, the open button 12, the close button 13, the release switch 14, the in-vehicle camera 15, and the display 16.

The control apparatus 100 includes a controller 110, a storage 120, and an in-vehicle communication module 130. The controller 110 has a function of performing an arithmetic process for controlling the control apparatus 100. The controller 110 includes a processor such as a CPU (Central Processing Unit), a main storage device such as RAM (Random Access Memory), and an auxiliary storage device such as ROM (Read Only Memory). Note that CPU is an example of processor resources. RAM and ROM are examples of memory resources. The controller 110 can execute arbitrary information processing based on various programs and various data. However, some or all of the functions of the controller 110 may be realized by a hardware circuit such as an ASIC or an FPGA.

The storage 120 is configured by any storage device such as RAM, ROM, hard disk drive, flash memory, etc. The storage 120 may also include removable media (portable recording media). Here, the removable media is, for example, a USB memory, an SD card, or a disc recording medium such as a CD-ROM, DVD disc, or Blu-ray disc. The storage 120 stores a program executed by the controller 110 and control data used for executing the program.

Further, the storage 120 stores data 121 indicating the position and range of the prohibited area E0 set in the vehicle 1. Further, in the control apparatus 100, the controller 110 counts the number of passengers and the number of standing passengers in the vehicle based on the image captured by the in-vehicle camera 15. Then, the number of counted passengers and the number of standing passengers 122 are stored in the storage 120.

The in-vehicle communication module 130 is an interface for the control apparatus 100 to communicate with other devices provided in the vehicle 1 using a predetermined in-vehicle communication standard. Examples of the predetermined in-vehicle communication standard include CAN (Controller Area Network) or LIN (Local Interconnect Network) and the like. The control apparatus 100 communicates with various devices provided in the vehicle 1 via the in-vehicle communication module 130.

In the control apparatus 100, the controller 110 executes opening control of the door 11 when it receives an indicate signal that the open button 12 has been pressed. Further, when the controller 110 receives an indicate signal that the close button 13 has been pressed, the controller 110 executes a closing control of the door 11. Further, the controller 110 acquires an image captured by the in-vehicle camera 15 via the in-vehicle communication module 130. Further, the controller 110 indicates the image captured by the in-vehicle camera 15 on the display 16.

Further, the controller 110 determines whether or not there is a standing passenger in the prohibited area E0 in the vehicle 1 based on the image acquired from the in-vehicle camera 15. Furthermore, the controller 110 prohibits the closing control of the door 11 when it detects the presence of a standing passenger in the prohibited area E0 inside the vehicle. In a state where the closing control of the door 11 is prohibited, the controller 110 does not execute the closing control of the door 11 even when a signal indicating that the close button 13 is pressed is received. Further, when the controller 110 receives an indicate signal that the release switch 14 has been turned on when the closing control of the door 11 is prohibited, the controller 110 cancels the prohibition of the closing control of the door 11. Further, when the controller 110 detects that a standing passenger existing in the prohibited area E0 has moved from the prohibited area E0 based on the image acquired from the in-vehicle camera 15, the controller 110 cancels the prohibition of the closing control of the door 11.

In the present embodiment, the control apparatus 100 does not necessarily have to be realized by a single physical configuration, but may be configured by a plurality of computers provided on the vehicle 1 and linked with each other.

(Control Flow)

Figure 4:
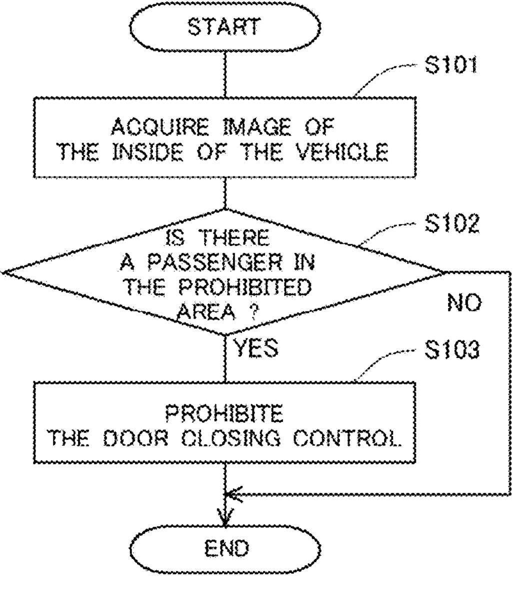
FIG. 4 is a first flowchart illustrating the flow of control executed by a controller while a door is in open state in a vehicle.
Figure 5:
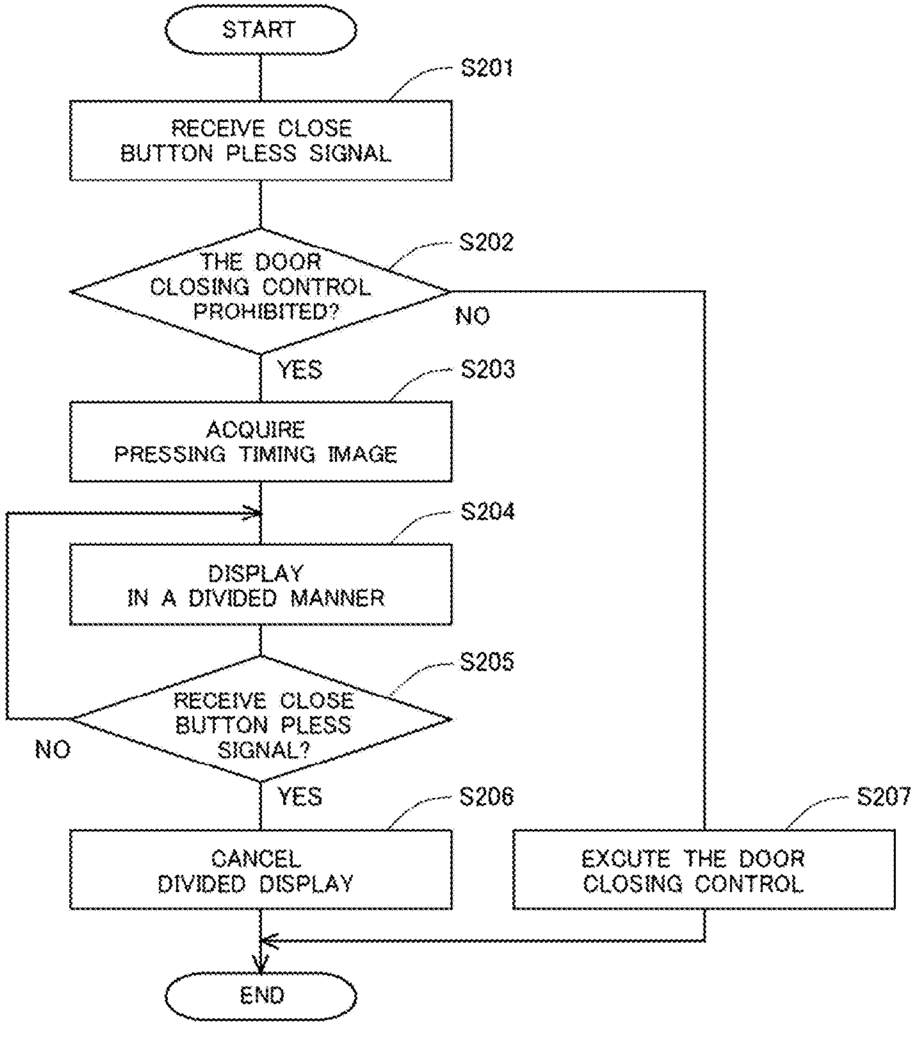
FIG. 5 is a second flowchart illustrating the flow of control executed by a controller when the door is open state in a vehicle.

Next, control performed by the control apparatus 100 when the vehicle 1 is stopped and the door 11 is open will be described with reference to FIGS., 4 and 5. FIG. 4 is a flowchart indicate the flow of a first control executed by the controller 110 when the door 11 is in open state in the vehicle. FIG. 5 is a flowchart indicate the flow of a second control executed by the controller 110 when the door 11 is in open state in the vehicle. When the door 11 is open in the vehicle 1, the controller 110 may repeatedly execute the control flow indicated in FIG. 4 and the control flow indicated in FIG. 5 at predetermined intervals.

First, the control flow indicated in FIG. 4 will be described. In this flow, in S101, an image of the inside of the vehicle captured by the in-vehicle camera 15 is acquired. Next, in S102, based on the image of the inside of the vehicle acquired in S101, it is determined whether or not there is a passenger in the prohibited area E0 in the vehicle. Specifically, the controller 110 extracts a standing passenger who is not seated in the seat from the image inside the vehicle.

Further, the controller 110 determines whether or not the position of the extracted standing passenger overlaps the prohibited area E0.

If it is negatively determined in S102, that is, if there is no passenger in the prohibited area E0 in the vehicle, the execution of this flow is temporarily terminated. In this case, the closing control of the door 11 is not prohibited in the vehicle 1. On the other hand, if it is positively determined in S102, that is, when it is detected that a passenger exists in the prohibited area E0 in the vehicle, the process of S103 is then executed. In S103, the closing control of the door 11 is prohibited. When the closing control of the door 11 is prohibited in S103, the prohibition of the closing control of the door 11 is continued until the passenger moves from within the prohibited area E0 in the vehicle or the release switch 14 is turned on by the driver.

Note that the vehicle 1 may be provided with a motion sensor for detecting passengers existing in the prohibited area E0 in the vehicle. In this case, instead of the image inside the vehicle captured by the in-vehicle camera 15, it may be detected that a passenger exists in the prohibited area E0 in the vehicle by the detection value of the motion sensor.

Next, the control flow indicated in FIG. 5 will be described. In this flow, a signal indicates that the close button 13 has been pressed is received in S201. Next, in S202, it is determined whether or not the closing control of the door 11 is prohibited. If the closing control of the door 11 is prohibited by executing the control flow indicated in FIG. 4 and the prohibition continues, it is positively determined in S202.

When a negative determination is made in S202, that is, when the closing control of the door 11 is not prohibited, the process of S207 is executed next. In S207, the closing control of the door 11 is executed. On the other hand, when a positive determination is made in S202, the process of S203 is then executed. In S203, a pressing timing image is acquired. Next, in S204, the press timing image acquired by S203 is displayed on the display 16 together with the real-time image in a divided manner.

Figure 6:
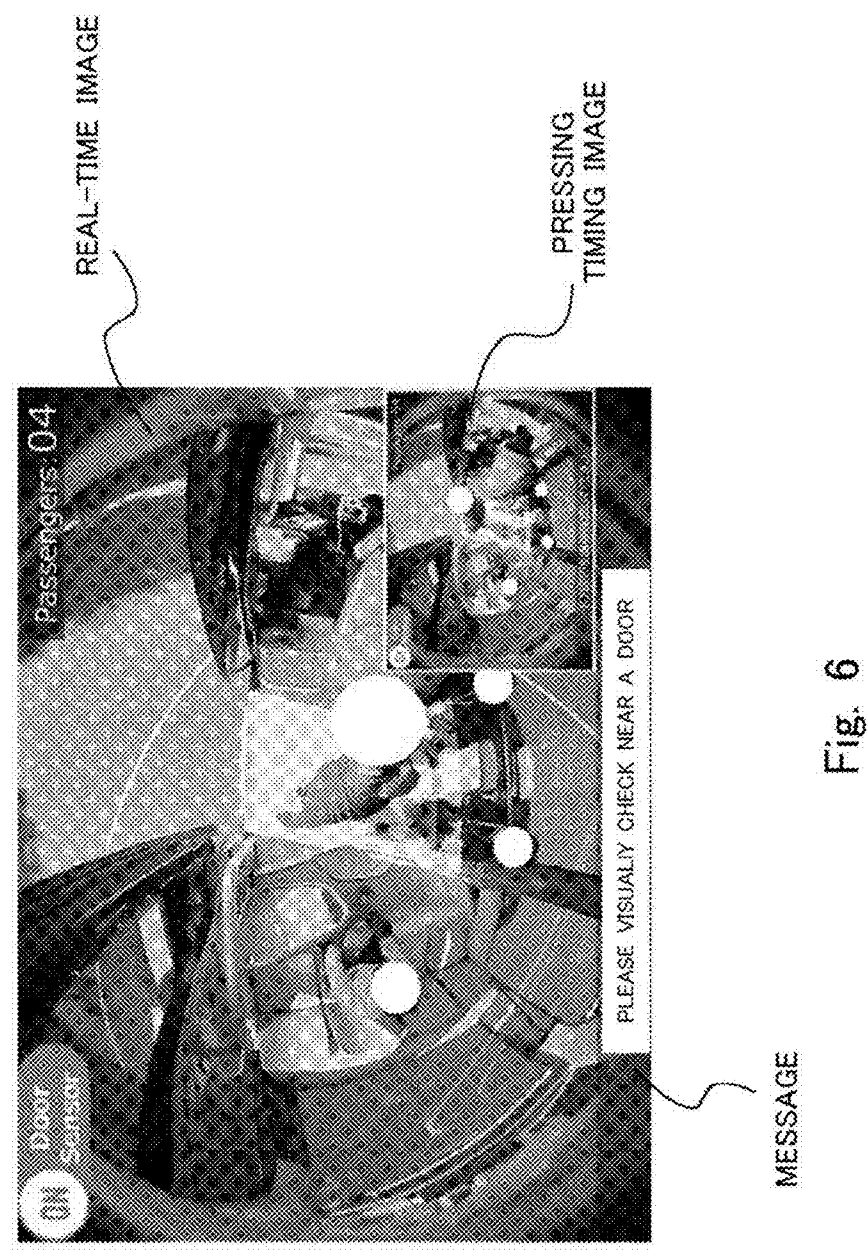
FIG. 6 is a diagram indicate an example of two images divided into a display.

FIG. 6 is a diagram indicate an example of two images displayed on the display 16 in a divided manner. As indicate in FIG. 6, in the display 16, a moving image is displayed as the real-time image, and a still image is displayed as the press timing image in some areas (in the lower right area in FIG. 6). Further, when the controller 110 displays these two images on the display FIG. 6, as indicate in FIG. 6, a message prompting the driver to visually check near the door 11 in the vehicle 1 may also be displayed on the display 16. According to this, when the closing control of the door 11 is not executed even though the driver presses the close button, the driver can be prompted to visually confirm. As a result, it can contribute to the driver grasping the situation inside the vehicle more accurately. However, it is not mandatory to display the message on the display 16.

Next, in S205, it is determined whether or not a signal indicate that the close button 13 has been pressed has been received. That is, it is determined whether or not the close button 13 is pressed again by the driver. If it is negatively determined in S205, that is, if the close button 13 has not yet been pressed again by the driver, the process of S204 is continued. That is, the divided display of the real-time image and the press timing image on the display 16 is continued. On the other hand, when it is positively determined in S205, that is, when the close button 13 is pressed again by the driver, the process of S206 is then executed. In S206, the divided display on the display 16 is canceled. That is, in the display 16, the display of the pressing timing image is erased and only the real-time image is displayed. At this time, if a message to the driver is displayed on the display 16 together with the division display of the two images, the display of the message is also canceled in S206.

When the two images are divided and displayed on the display 16, the driver can also determine that there is no problem with the safety of passengers even if the door 11 is closed by checking the situation near the door 11 in the vehicle 1. In this case, the driver cancels the prohibition of the closing control of the door 11 so that the closing control of the door 11 is executed. That is, the driver presses the close button 13 again after turning on the release switch 14. As a result, the close button 13 is pressed while the prohibition of closing control of the door 11 is released. In this case, the controller 110 cancels the divided display of the two images on the display 16 in S206 and executes closing control of the door 11.

According to the above flow, when the close button 13 is pressed while the closing control of the door 11 is prohibited, the press timing image is divided and displayed on the display 16 together with the real-time image for a period until the close button 13 is pressed again. As a result, it is possible for the driver to check the situation in the prohibited area E0 at the timing when the close button 13 is pressed together with the real-time situation in the vehicle. Therefore, even if a passenger is moving from within the prohibited area E0 immediately after the close button 13 is pressed during the prohibition of closing control of the door 11, the driver can confirm that there was a passenger in the prohibited area E0 at the time when the closing close button 13 was pressed. Therefore, at the time when close button 13 was pressed there was a passenger in the prohibited area E0, so closing of door 11 When control is to be executed, the driver can grasp the reason why door closing control was not executed.

In the flow indicate in FIG. 5, the period during which the press timing image is divided and displayed on the display 16 together with the real-time image (split display period) is the period from when the close button 13 is pressed during the prohibition of closing control of the door 11 to the period from when the close button 13 is pressed again. However, the split display period is not limited to such periods. For example, the division display period may be a predetermined fixed period. However, by setting the split display period to the period from when the close button 13 is pressed during the prohibition of closing control of the door 11 to when the close button 13 is pressed again, it is possible for the driver to confirm the press timing image displayed divided on the display 16 with a high probability.

Other Embodiments

The embodiments described above are merely examples, and the present disclosure may be changed and implemented as appropriate within the scope of the disclosure. Furthermore, processes and elements described in the present disclosure may be freely combined to the extent that no technical conflict exists.

Furthermore, a process that is described to be performed by one apparatus may be shared and performed by a plurality of apparatuses. Processes described to be performed by different apparatuses may be performed by one apparatus. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer programs may be provided to the computer by a non-transitory computer-readable storage medium that can be connected to a system bus of the computer, or may be provided to the computer through a network. The non-transitory computer-readable storage medium may be any type of disk including magnetic disks (floppy (registered trademark) disks, hard disk drives (HDDs), etc.) and optical disks (CD-ROMs, DVD discs, Blu-ray discs, etc.), and any type of medium suitable for storing electronic instructions, such as read-only memories (ROMs), random access memories (RAMs), EPROMS, EEPROMs, magnetic cards, flash memories, or optical cards.

What is claimed is:

1. A control apparatus that controls a door of a vehicle on which a plurality of passengers are on board, wherein a predetermined area, where door closing control is prohibited when a passenger's presence in the predetermined area is detected, is set near the door inside the vehicle, a close button pressed by a driver of the vehicle when the driver executes the door closing control, an in-vehicle camera that captures an image of the interior of the vehicle including the predetermined area, and a display that displays the image of the interior of the vehicle captured by the in-vehicle camera, are provided in the vehicle, the control apparatus having a controller configured to:

prohibit the door closing control when the passenger's presence in the predetermined area is detected while the door is in open state, and display, when the close button is pressed by the driver while the door closing control is prohibited, image captured by the in-vehicle camera at the timing when the close button is pressed, on the display for a predetermined period of time, together with real-time image of the inside of the vehicle captured by the in-vehicle camera in a divided manner.

2. The control apparatus according to claim 1, wherein the predetermined period is a period until the close button is pressed again by the driver.

3. A vehicle comprising the control apparatus according to claim 2.

4. The control apparatus according to claim 1, wherein the controller displays a message urging the driver to visually check near the door inside the vehicle on the display together with the divided display image for the predetermined period of time.

5. A vehicle comprising the control apparatus according to claim 4.

6. The control apparatus according to claim 1, wherein, in the vehicle, a floor surface inside the vehicle including the predetermined area is substantially flat, and the door is a sliding door.

7. A vehicle comprising the control apparatus according to claim 6.

8. A vehicle comprising the control apparatus according to claim 1.

* * * * *